United States Patent [19]
Ono

[11] Patent Number: 5,460,094
[45] Date of Patent: Oct. 24, 1995

[54] TRIGGER DEVICE

[75] Inventor: Katsuyasu Ono, Kanagawa, Japan

[73] Assignee: NSK Ltd., Tokyo, Japan

[21] Appl. No.: 268,936

[22] Filed: Jun. 30, 1994

[30] Foreign Application Priority Data

Jul. 5, 1993 [JP] Japan .................. 5-042296 U

[51] Int. Cl.⁶ ..................... F42C 1/00; B60R 21/18; B60R 21/32; H01H 35/14
[52] U.S. Cl. .................. 102/272; 280/733; 280/734; 200/61.45 M
[58] Field of Search ................... 102/272, 273, 102/216; 280/733, 734; 200/61.45 M

[56] References Cited

U.S. PATENT DOCUMENTS

| | | |
|---|---|---|
| 3,601,081 | 8/1971 | Smith . |
| 4,116,132 | 9/1978 | Bell ............................ 102/272 |
| 4,481,389 | 11/1984 | Johnson . |
| 4,596,971 | 6/1986 | Hirabayashi et al. . |
| 4,902,036 | 2/1990 | Zander et al. ................ 280/736 |
| 5,005,861 | 4/1991 | Breed et al. .................. 280/734 |
| 5,059,751 | 10/1991 | Woodman et al. ............. 200/61.45 M |
| 5,177,370 | 1/1993 | Meister ...................... 200/61.45 M |
| 5,192,839 | 3/1993 | Imade et al. ................. 200/61.45 M |
| 5,217,252 | 6/1993 | Kawaguchi et al. ............ 280/731 |
| 5,248,861 | 9/1993 | Kato et al. . |
| 5,279,227 | 1/1994 | Nishizawa . |
| 5,283,402 | 2/1994 | Green ........................ 200/61.45 M |
| 5,322,981 | 6/1994 | Grossi, III et al. ............ 200/61.45 M |
| 5,369,231 | 11/1994 | Anderson et al. ............. 200/61.45 M |
| 5,383,388 | 1/1995 | Ono .......................... 280/734 |

FOREIGN PATENT DOCUMENTS

| | | |
|---|---|---|
| 0591685 | 4/1994 | European Pat. Off. . |
| 396456 | 4/1991 | Japan . |
| 4108049 | 4/1992 | Japan . |
| 2236622 | 4/1991 | United Kingdom . |
| 2247352 | 2/1992 | United Kingdom . |

*Primary Examiner*—Charles T. Jordan
*Assistant Examiner*—Theresa M. Wesson
*Attorney, Agent, or Firm*—Evenson, McKeown, Edwards & Lenahan

[57] ABSTRACT

A trigger device is provided with a firing pin made of a non-magnetic material and arranged movably toward a detonator, an inertia body formed of a permanent magnet and arranged movably toward the detonator, and a cylindrical permanent magnet having an inner diameter greater than an outer diameter of the inertia body. The firing pin extends freely through the inertia body. When an acceleration acting on the inertia body exceeds repulsion between the inertia body and the cylindrical permanent magnet, the inertia body is caused to move toward the detonator through a cavity of the cylindrical permanent magnet so that the firing pin strikes and fires the detonator. An attracting disk made of a magnetic material is arranged in close contact with a detonator-side magnetic pole surface of the cylindrical permanent magnet so that attraction for the inertia body is increased.

9 Claims, 4 Drawing Sheets

5,460,094

TRIGGER DEVICE

BACKGROUND OF THE INVENTION

1) Field of the Invention

This invention relates to an improvement in a trigger device for actuating a webbing tightener adapted to rotate a take-up spindle of a retractor in a webbing wind-in direction in the event of a collision of a vehicle or an air bag system for protecting an occupant from impact by an air bag promptly inflated with gas in the event of a collision.

2) Description of the Related Art

To protect an occupant in the event of an emergency such as a vehicular collision, passive restraint systems such as a webbing tightener and an air bag system have found widespread utility in recent years.

The webbing tightener comprises, for example, a pulley rotatably mounted on a take-up spindle of a retractor, a cable wound on the pulley, and a piston connected to a free end of the cable and slidably received within a cylinder. Pressure of expanded gas is caused to act on the piston so that a thrust is produced. This thrust then applies a tension to the cable, whereby the cable drives the take-up spindle of the retractor in a webbing winding direction, that is, in a webbing take-up direction. As a consequence, the webbing applied on an occupant is taken up in the event of an emergency. The webbing tightener is therefore provided with a gas generator for supplying gas pressure so that the gas pressure acts on the piston within the cylinder to apply a tension to the cable. This gas generator includes a detonating heater and an explosive. By a signal from a collision sensor, the detonating heater is energized and the resulting heat of the detonating heater detonates the explosive to generate gas.

The air bag system is accommodated, for example, in a steering wheel as a module, which is constructed of a center pad, a folded air bag, an inflator (gas generator), etc. In the event of a vehicular collision, the inflator is ignited to cause immediate combustion. The resulting combustion gas then instantaneously inflates the air bag, whereby the occupant's body is received by the inflated air bag and an impact on the body can be reduced. The air bag system is therefore equipped with a gas generator to supply inflating gas so that the air bag is inflated. According to the gas generator, an igniting charge is fired to ignite a propelling charge. As a result, the propelling charge immediately burns to generate inflating gas.

Gas generators for such webbing tighteners and air bag systems as described above therefore require a trigger device for firing an igniting charge subsequent to detection of a vehicular collision so that the gas generators can be actuated. As these trigger devices, those of the type that a firing heater arranged in an igniting charge is energized responsive to a signal from a collision sensor and the igniting charge is then fired by heat generated from the firing heater have been used commonly, for example, like the firing devices disclosed in Japanese Patent Applications Laid-Open Nos. HEI 2-24242 and 3-96456.

These gas generators however require vehicle body acceleration detection means, such as an acceleration sensor, for sensing a collision or the like of a vehicle to generate a firing signal and a control circuit for determining based on the firing signal whether or not the firing heater should be energized. This has led to the following problems:

1) More parts are needed, and the construction becomes more complex.

2) Wiring for individual electric components must be connected surely to assure the reliability of the system, so that the assembly work is not easy.

3) The system hence becomes expensive.

With a view to overcoming these problems, mechanical trigger devices have hence been developed like the trigger device disclosed in Japanese patent Application Laid-Open No. SHO 4-108049. According to such mechanical trigger devices, movement of a weight which also serves as an acceleration sensor for a vehicle body causes a firing pin to strike an igniter associated with an igniting charge, so that the igniting charge is fired by the resulting impact and such a complex control circuit is no longer needed.

According to the construction of the mechanical trigger device disclosed in Japanese patent Application Laid-Open No. SHO 4-108049, a trigger shaft is caused to rock by movement of a weight as an inertia body so that a stopper portion of the trigger shaft, said stopper portion having been in contact with a flange portion of a firing pin, is disengaged from the flange portion. This allows the firing pin to jut out under force of a compression spring and to strike a propelling charge.

The trigger device in which the firing pin is caused to strike the detonator arranged in association with the igniting charge as described above has however been pointed out to involve some problems. There is the potential problem that the stopper portion of the trigger shaft and the flange portion of the firing pin may rust or may stick together at areas of contact therebetween in the course of a long time. It is also difficult to keep the coefficient of friction stable at the areas of contact therebetween. Any attempt to increase the sensitivity leads to higher possibility of inadvertent actuation, thereby making it difficult to adjust the actuation sensitivity. This results in a system having low flexibility in design choice.

SUMMARY OF THE INVENTION

An object of the present invention is to overcome the above problems and to provide a trigger device which has high flexibility in design choice, is prevented from inadvertent actuation and hence has high reliability, has a simple construction and permits easy assemblage, and is inexpensive.

In one aspect of the present invention, there is thus provided a trigger device for actuating a gas generator with a detonator incorporated therein, comprising:

a firing pin movable toward said detonator so that upon striking said detonator, said detonator is fired;

an inertia body formed of a permanent magnet for supplying kinetic energy to said firing pin and movable toward said detonator, said inertia body having one of N and S poles on one side thereof and the other pole on an opposite side thereof with respect to the direction of movement thereof;

a cylindrical permanent magnet having an inner diameter sufficient to permit passage of said inertia body and arranged between said inertia body and said detonator, said cylindrical permanent magnet having a pole, which is of the same polarity as said one pole, formed on a side closer to said inertia body and another pole, which is of the same polarity as said other pole, formed on a side closer to said detonator; and an attracting member made of a magnetic material and disposed on a detonator side of said cylindrical permanent magnet.

In another aspect of the present, there is also provided a trigger device for actuating a gas generator with a detonator incorporated therein, comprising:

- a firing pin disposed movably toward said detonator so that upon striking said detonator, said detonator is fired;
- an inertia body formed of a permanent magnet for supplying kinetic energy to said firing pin and disposed movably toward said detonator;
- a cylindrical permanent magnet having a cavity of an inner diameter greater than a profile of said inertia body as viewed in the direction of movement of said inertia body; and
- an attracting disk made of a magnetic material, disposed in close contact with a detonator-side magnetic pole surface of said cylindrical permanent magnet and centrally defining a through-aperture through which said firing pin extends freely;
- whereby upon occurrence of an acceleration of at least a predetermined value on said inertia body in a direction toward said detonator, said inertia body moves toward said detonator through said cavity of said cylindrical permanent magnet against magnetic repulsion between said cylindrical permanent magnet and said inertia body and causes said firing pin to move toward said detonator by magnetic attraction between said cylindrical permanent magnet and said firing pin.

According to the trigger device in each of the above aspects of this invention, the inertia body which senses an acceleration of a vehicle body applies impact energy directly to the detonator, so that the construction is simple to permit easy assemblage and the energy of impact against the detonator can be increased with the magnitude of an acceleration acting on the inertia body. The exclusion of any member maintained in contact under pressure with the firing pin or the inertia body has eliminated the potential problem that the trigger device may fail to operate due to their rusting or sticking at areas of contact therebetween in the course of a long time, thereby assuring stable operation.

Further, the attracting member disposed on the side of the detonator or the attracting disk arranged in close contact with the detonator-side magnetic pole surface is magnetized, thereby acting to attract the inertia body like the other magnetic pole of the cylindrical permanent magnet, said other magnetic pole being on the side closer to the detonator, or the detonator-side magnetic pole of the cylindrical permanent magnet. It is therefore possible to increase only the attraction acting on the inertia body while keeping unchanged the magnitude of repulsion acting on the inertia body by the magnetic pole of the cylindrical permanent magnet, said magnetic pole being on the side closer to the detonator, or the detonator-side magnetic pole of the cylindrical permanent magnet. This has improved the flexibility in design choice and has also made it easier to freely and independently adjust the repulsion, the factor determining the sensitivity of actuation, and the attraction, the factors determining the reliability of firing by the detonator and the time required until firing. It has hence become possible to easily materialize the ideal design that while optimizing the sensitivity of operation, the detonator can be fired in a still shorter time without failure.

It is therefore possible to provide a trigger device which has high flexibility in design choice, is prevented from inadvertent actuation and hence has high reliability, has a simple construction and permits easy assemblage, and is inexpensive.

DETAILED DESCRIPTION OF THE INVENTION AND PREFERRED EMBODIMENTS

Based on FIGS. 1 to 4 of the accomanying drawings, the trigger device according to the first embodiments of the present invention will hereinafter be described in detail.

Figure 1:
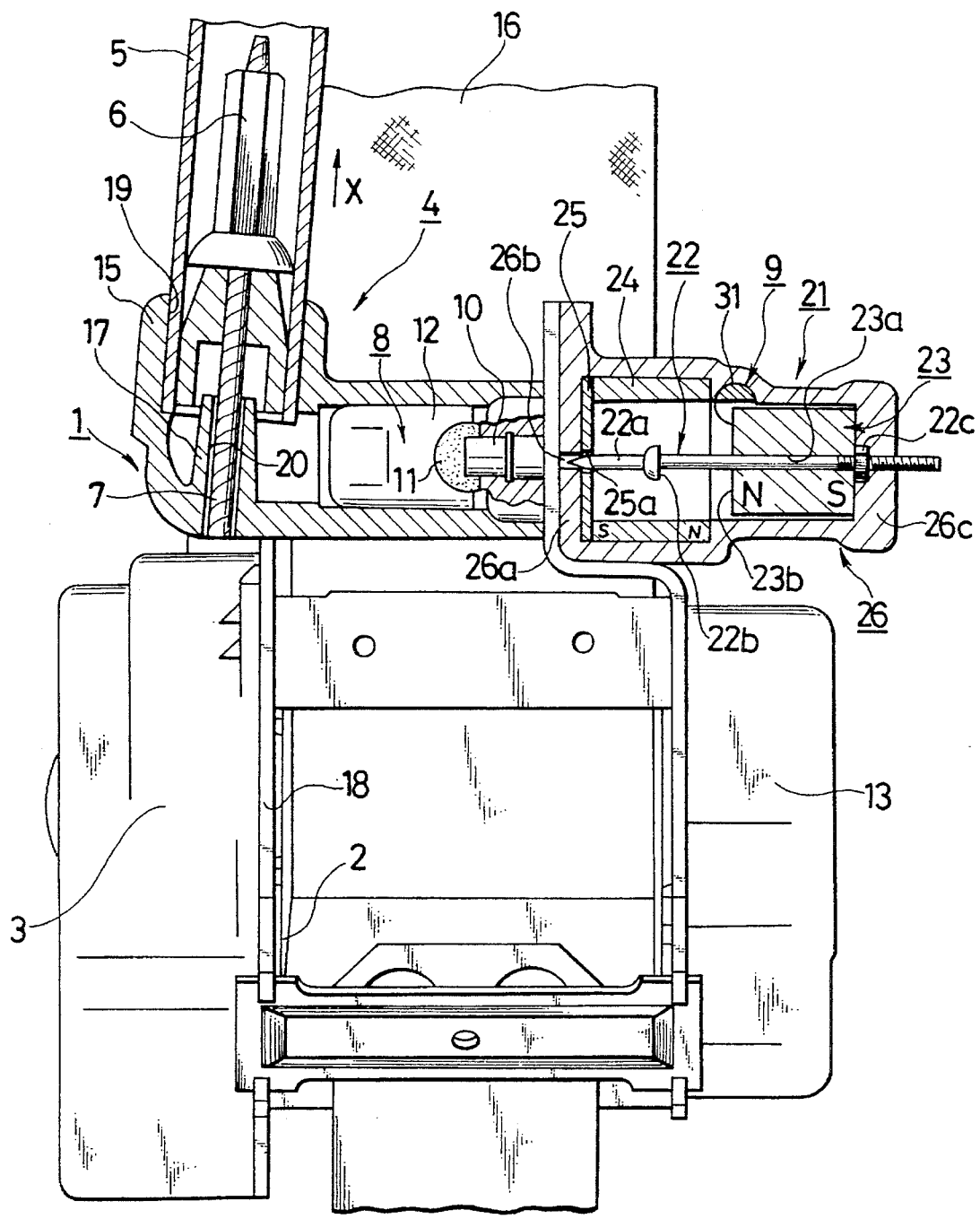
FIG. 1 is a partly cross-sectional, front elevation of a retractor having a pretensioner equipped with a trigger device according to a first embodiment of the present invention.

Referring first to FIG. 1, a retractor 1 having a pretensioner 3 is provided with a take-up reel 2 on which a webbing 16 is wound so that the webbing 16 can be wound in or out as desired. By a take-up spring connected to a take-up spindle (not shown) of the take-up reel 2, the take-up reel 2 is normally biased in a direction in which the webbing 16 is taken up. In the event of a collision, the take-up spindle is prevented from rotation by a known emergency lock mechanism 13 so that the webbing 16 is prevented from being wound out any further.

On one of the side walls of a retractor base 18 in the form of a substantially turned square U, the retractor 1 is provided with the pretensioner 3 which is a webbing tightener for rotating the take-up spindle in a direction to reduce slack of the webbing in the event of a vehicular collision. The retractor 1 with the pretensioner 3 integrally assembled in advance as a assembly on the retractor is mounted on a vehicle body panel.

The pretensioner 3 applies tension to a wire 7 which is wound, for example, as a transmitting member on an unillustrated pulley rotatably mounted on an end portion of the take-up spindle. The wire 7 drives the take-up spindle in the webbing-winding direction so that the webbing 16 applied to an occupant is taken up in the event of an emergency. The pretensioner 3 is provided with drive means 4 for applying tension to the wire 7 and a trigger device 21 for sensing a vehicular collision and actuating said drive means 4.

Said drive means 4 comprises a piston 6 connected to one end of the wire 7, a cylinder 5 made of a metal, preferably aluminum and slidably accommodating the piston 6 therein, a metal-made housing 15 communicating and connecting a basal end portion of the cylinder 5 with a gas blow-out portion of a gas generator 8, and the trigger device 21 for actuating the gas generator 8 in response to an acceleration of at least a predetermined value.

The housing 15 is a tubular member bent substantially at a right angle, that is, in a substantially L shape. The basal end portion of the cylinder 5 is fixed in an opening 19 of the housing 15 and the wire 7 connected to the piston 6 extends through a bore 20 formed in opposition to the opening 19.

On and along a peripheral edge of the bore 20 in the housing 15, a tubular protective wall 17 is disposed extending toward the opening 19 so that the wire 7 located below a lower end face of the piston 6 within the housing 15 is covered by the protective wall 17.

The gas generator 8 comprises a casing 12, which encloses an explosive 11 therein and is hermetically mounted on the other side wall of the retractor base 18, and a detonator 10 assembled in the casing 12. When the detonator 10 is struck and the explosive 11 is ignited, expanded gas is blown out through the gas blow-out portion formed at a free end of the casing 12. Accordingly, the trigger device 21 for striking the detonator 10 is fixed at a side of the detonator 10 of the gas generator 8 with the side wall of the retractor base 18 interposed therebetween.

Figure 2:
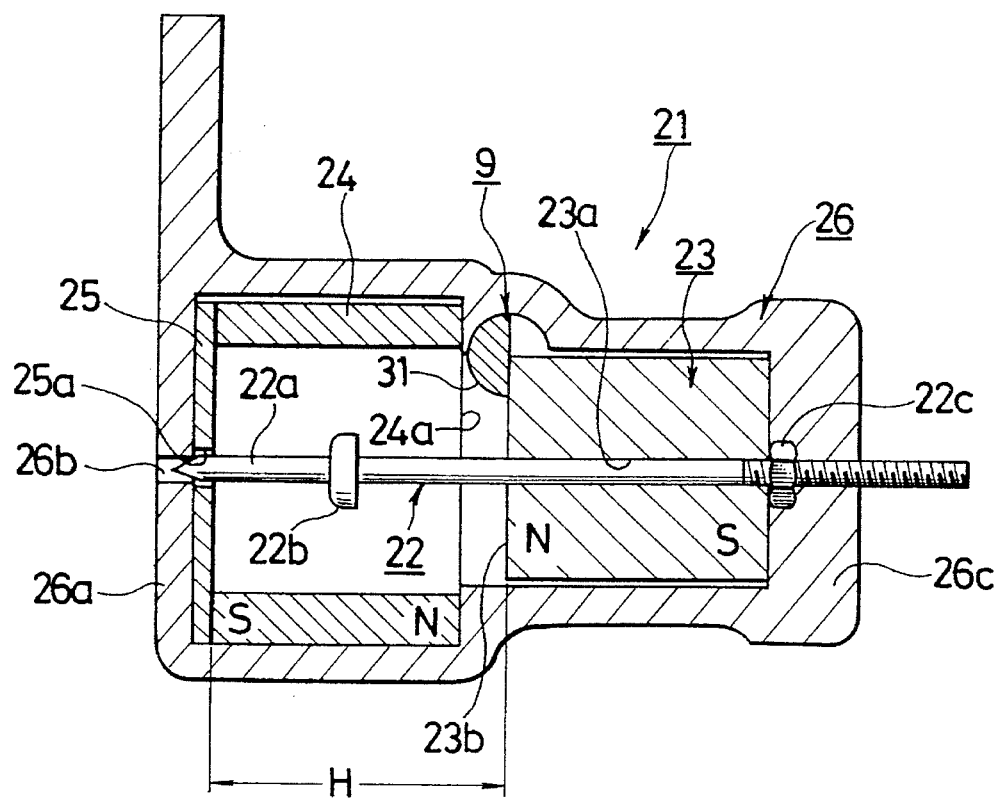
FIG. 2 is a vertical cross-section of the trigger device shown in FIG. 1.

The trigger device 21 is constructed, as also shown in FIG. 2, of a firing pin 22, an inertia body 23, a cylindrical permanent magnet 24, an attracting disk 25, a trigger casing 26 and an inadvertent actuation preventing mechanism 9. The firing pin 22 is made of a non-magnetic material such as stainless steel and is movable toward the detonator 10 so that the detonator 10 can be struck and fired. The inertia body 23 is formed of a cylindrical solid permanent magnet defining along a central axis thereof a through-hole through which the firing pin 22 freely extends. The inertia body 23 supplies kinetic energy to the firing pin 22. The cylindrical permanent magnet 24 has an inner diameter greater than an outer diameter of the inertia body 23. The attracting disk 25 is made of a magnetic material such as steel, is arranged preferably in close contact with a detonator-side magnetic pole surface of the cylindrical permanent magnet 24, and centrally defines a through-aperture 25a through which the firing pin 22 extends freely. The trigger casing 26 is made of a non-magnetic material such as aluminum or plastics, accommodates therein the firing pin 22, the inertia body 23, the cylindrical permanent magnet 24 and attracting disk 25, and is fixed on the side wall of the retractor base 18. The inadvertent actuation preventing mechanism 9 is disposed on the trigger casing 26 and prevents inadvertent actuation of the trigger device 21. As is illustrated in FIG. 2, the firing pin 22 has a hammer pin 22a formed at a free end portion thereof to strike the detonator 10 and a flange portion 22b formed at a basal portion of the hammer pin 22a. The firing pin 22 is arranged inside the trigger casing 26 with a rear end portion thereof slidably fitted in a bottom wall portion 26c of the trigger casing 26. In the illustrated embodiment, a nut 22c threadedly put on the rear end portion which extends rearwardly through the through-hole 23a of the inertia body 23 is brought into contact with a bottom-wall-side end of the inertia body 23, whereby the firing pin 22 is prevented from moving toward the detonator 10 relative to the inertia body 23 and its movement toward the detonator 10 is regulated in an initial state. By adjusting the tightening of the nut 22c, the distance between the inertia body 23 and the flange portion 22b of the firing pin 22 is adjustable. Instead of the nut 22c, a crimped member or the like may be fixed on the firing pin 22.

Accordingly, the hammer pin 22a extends through the through-aperture 25a of the attracting disk 25 and also an opening 26b formed in a detonator-side wall portion 26a of the trigger casing 26 and is located in opposition to the detonator 10 with a space left therebetween. Further, the flange portion 22b is located in opposition to a bottom-wall-portion-side end surface of the attracting disk 25 arranged in close contact with an inner wall of the wall portion 26a with a space left between the flange portion 22b and the bottom-wall-portion-side end surface. When the inertia body 23 is caused to strike the flange portion 22b, the firing pin 22 to which kinetic energy has been supplied from the inertia body 23 moves toward the detonator 10 so that the hammer pin 22a strikes and fires the detonator 10.

The cylindrical permanent magnet 24 is fitted in the trigger casing 26 on a side of the detonator 10. The inertia body 23 with the firing pin 22 freely extending therethrough is accommodated in the trigger casing 26 on a side of the bottom wall portion of the trigger casing.

The inertia body 23 is arranged in such a way that a detonator-side end 23b is spaced from a bottom-wall-portion-side end 24a of the cylindrical permanent magnet 24 and their adjacent magnetic poles have the same polarity (N pole-N pole in the drawings), so that the inertia body 23 is biased away from the detonator 10, namely, toward the bottom wall portion 26c by magnetic repulsion. In other words, the inertia body 23 is slidable in the direction of an axis along the firing pin 22 but unless force of a magnitude greater than the magnetic repulsion acting between the cylindrical permanent magnet 24 and the inertia body 23 acts toward the detonator 10 on the inertia body 23, the inertia body 23 cannot move toward the detonator 10 so that the trigger device 21 is not actuated.

Where the inadvertent actuation preventing mechanism 9 has been released and a shaft 31 supported on the trigger casing 26, said shaft 31 being a stopper of the inadvertent actuation preventing mechanism 9, is located out of interference with the inertia body 23, the inertia body 23 moves toward the detonator 10 (leftwards as viewed in FIG. 3A) when inertia force of the inertia body, said inertia force being the product of the mass of the inertia body 23 and its acceleration toward the detonator 10, becomes greater than the magnetic repulsion between the inertia body 23 and the cylindrical permanent magnet 24.

Figure 3A:
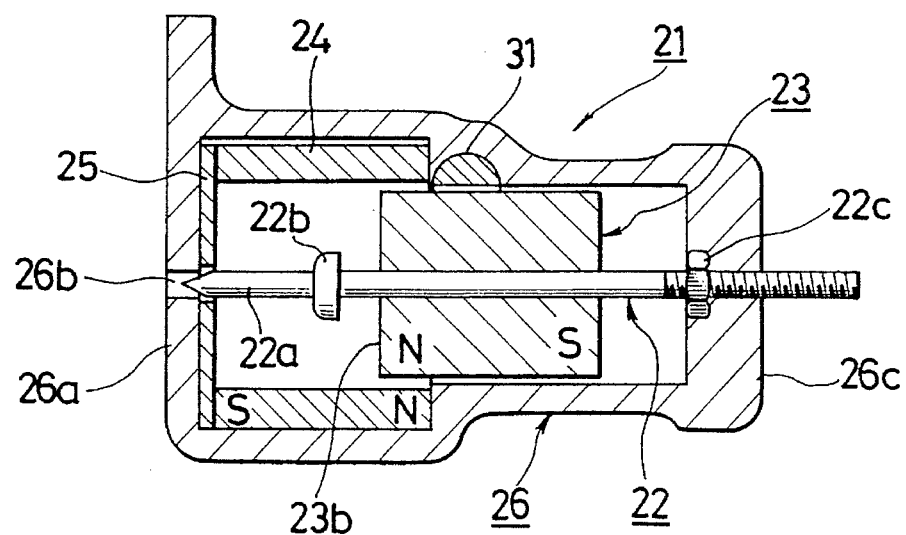
FIGS. 3A, 3B and 3C are vertical cross-sections illustrating the states of operation of the trigger device shown in FIG. 2.
Figure 3B:
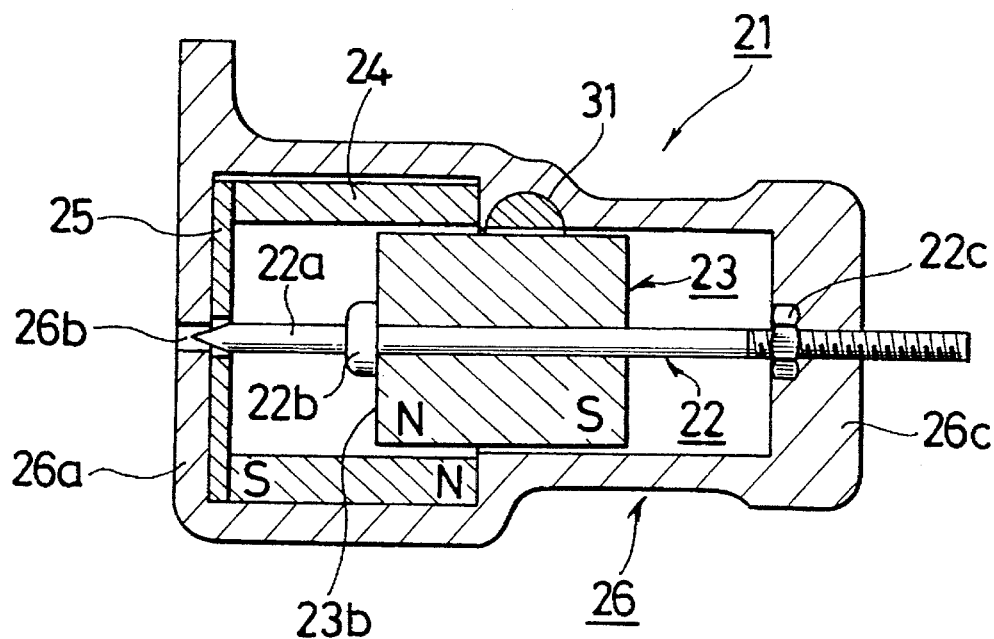

When the inertia body 23 moves to a region where magnetic attraction acts on the inertia body 23, the inertia body 23 is accelerated toward the detonator 10 by the magnetic attraction so that as illustrated in FIG. 3B, the inertia body 23 enters a cavity of the cylindrical permanent magnet 24 and strikes the flange portion 22b. As has been described above, the inertia body 23, by using the change of the magnetic force from repulsion to attraction, has both a function as an acceleration sensor and a function as trigger means for initiating supply of impact energy to the firing pin 22. In general, the firing pin 22 itself has also started moving under the acceleration directed toward the detonator so that the inertia body 23 and the flange portion 22b are not necessarily brought into contact with each other at the position shown in FIG. 3B.

Figure 3C:
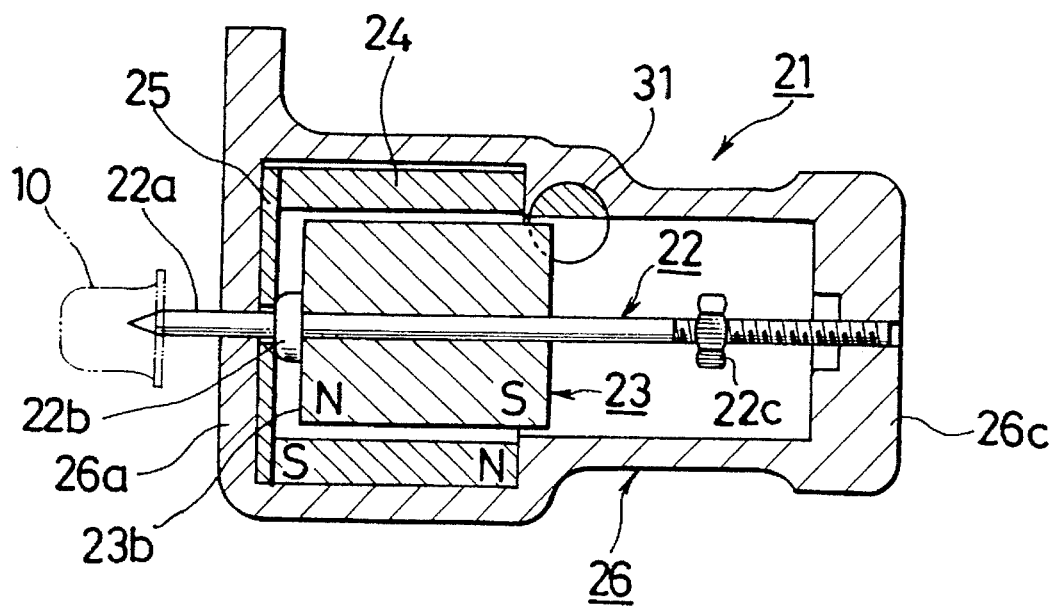

Further, the inertia body 23 accelerated toward the detonator 10 under magnetic attraction then moves the firing pin 22 in a direction toward the detonator 10 as shown in FIG. 3C, whereby the hammer pin 22a strikes and fires the detonator 10. In this embodiment, it is designed that the detonator 10 is fired before the flange portion 22b of the firing pin 22 is brought into contact with the attracting disk 25 placed in close contact with the inner wall of the wall portion 26a.

The attracting disk 25 in this embodiment is made of a magnetic material such as steel and has a diameter equal to that of the cylindrical permanent magnet 24, because lines of magnetic force do not extend from the cylindrical permanent magnet 24 to the attracting disk 25 if the outer diameter of the attracting disk 25 is smaller than that of the cylindrical permanent magnet 24, lines of magnetic force extend outwardly if the outer diameter of the attracting disk 25 is greater than that of the cylindrical permanent magnet 24, and attraction by the attracting disk 25 is hence lowered in each case. Further, the wall thickness of the trigger casing 26 is set preferably at a relatively large value (for example, 1.5 to 2.5 mm or so) so that magnetic force from the outside of the trigger casing 26 would not affect lines of magnetic force of the inertia body 23, the cylindrical permanent magnet 24, the attracting disk 25 and the like inside the trigger casing 26. Although the trigger casing 26 is simplified in the illustrated embodiment, it is formed, for example, by integrally combining the wall portion 26a and the remaining portion together.

In the trigger device 21 of the above-described construction, the inertia body 23 moves toward the detonator 10 when inertia force, the product of the mass of the inertia body 23 and an acceleration toward the detonator 10, becomes greater than the magnetic repulsion. When the inertia body 23 moves to a region where magnetic attraction acts on the inertia body 23, the inertia body 23 is accelerated toward the detonator under the magnetic attraction. The inertia body 23 therefore enters the cavity of the cylindrical permanent magnet 24 at an accelerated speed and strikes the flange portion 22b of the firing pin 22. The firing pin 22 then strikes the detonator 10 and fires the detonator 10.

Since the inertia body 23 which senses an acceleration of a vehicle body directly applies impact energy to the detonator 10, the trigger device 21 is simple in construction and easier in assemblage and at the same time, can increase the impact energy to the detonator 10 in accordance with the magnitude of an acceleration acting on the inertia body 23. Further, there is not member maintained in contact under pressure with the firing pin 22 or the inertia body 23. The trigger device is therefore free of the potential problem that they may rust or stick together at areas of contact therebetween in the course of a long time and the trigger device 21 may fail to actuate, thereby making it possible to prevent inadvertent actuation and to improve the reliability.

It is also desired for the trigger device 21 to achieve fail-free firing of the detonator at an optimal actuation sensitivity within a shorter time. Desirably, this optimal actuation sensitivity can be adjusted as needed in accordance with characteristics of a vehicle on which the trigger device is mounted. Even when the actuation sensitivity has been adjusted, it is still desired to shorten as much as possible the actuation time required until firing of the detonator. Accordingly, it is desired to permit free adjustment of the magnetic repulsion between the inertia body 23 and the cylindrical permanent magnet 24, said magnetic repulsion being a factor determining the actuation sensitivity, and also free setting of magnetic attraction between the inertia body 23 and the cylindrical permanent magnet 24, said magnetic attraction being a factor determining the actuation time, independently from the repulsion so adjusted.

In the trigger device 21 according to this embodiment, the provision of the attracting disk 25 has facilitated free adjustment of the magnetic repulsion and attraction acting between the inertia body 23 and the cylindrical permanent magnet 24 independently from each other. This has made it possible to fire the detonator 10 in a shorter time at a desired actuation sensitivity conforming with characteristics and the like of a vehicle.

These matters will hereinafter be described in detail.

To modify the actuation sensitivity of a trigger device, the following three measures are conceivable:

(1) To change the weight of the inertia body 23.

(2) To change the acting repulsion by altering the magnetic strength of the inertia body 23.

(3) To change the acting repulsion by altering the magnetic strength of the cylindrical permanent magnet 24.

In the case of the measure (1), the magnetic force of the inertia body 23 also changes with a change in the weight (volume) because the inertia body 23 is a magnet. Even if it is attempted to increase the actuation sensitivity by making the inertia body 23 heavier, the magnetic force of the inertia body 23 increases with the weight and the resulting increase in the repulsion acts to lower the actuation sensitivity. As a consequence, the effect available from the weight increase of the inertia body 23 is canceled out, thereby failing to bring about any significant effects. Similar results are obtained when the actuation sensitivity is lowered by reducing the weight.

In the case of the measure (2), the effect available from the change in the magnetic force of the inertia body 23 is canceled out by the change in the weight of the inertia body 23, thereby failing to bring about any significant effects as in the case of the measure (1).

In the case of the measure (3), the repulsion can be modified rather easily and the actuation sensitivity can be adjusted. On the other hand, the repulsion and the attraction have a constant relationship, so that the attraction is increased or decreased in proportion to an increase or decrease in the repulsion and even the performance for accelerating the firing pin 22 is changed.

As has been described above, the measure in which the magnetic force of the inertia body 23 or the cylindrical permanent magnet 24 is directly changed changes the repulsion and the attraction in a certain constant relationship, thereby making it very difficult to retain repulsion for optimal actuation sensitivity and at the same time, to achieve shortening of the actuation time by adjusting the attracting independently from the repulsion.

However, the attracting disk 25 is disposed in close contact with the detonator-side magnetic pole surface of the cylindrical permanent magnet 24 and is magnetized with the same polarity as the magnetic pole S of the cylindrical permanent magnet 24, said magnetic pole S being in close contact with the attracting disk 25. Like the detonator-side magnetic pole of the cylindrical permanent magnet 24, the attracting disk 25 also acts to attract the N pole (i.e., the detonator-side end 23b) of the inertia body 23 so that the attraction for the inertia body 23 is increased. Moreover, magnetic force decreases at an increasing tempo as the distance increases. Action of the attraction by the attracting disk 25 can therefore be limited to a range where the inertia body 23 has entered the cylindrical permanent magnet 24 and is located near the attracting disk 25. In a range where the inertia body 23 is under the repulsion from the cylindrical permanent magnet 24, influence of the attraction by the attracting disk 25 can be ignored practically.

The provision of the attracting disk 25 can therefore increase only the attraction without changing the repulsion as the factor determining the actuation sensitivity, thereby making it possible to accelerate the striking speed of the inertia body 23 against the detonator 10 and to improve the reliability of firing of the detonator 10. It has therefore become possible to provide the trigger device 21 which can surely fire the detonator 10 at an optimal actuation sensitivity in a short time.

Figure 4:
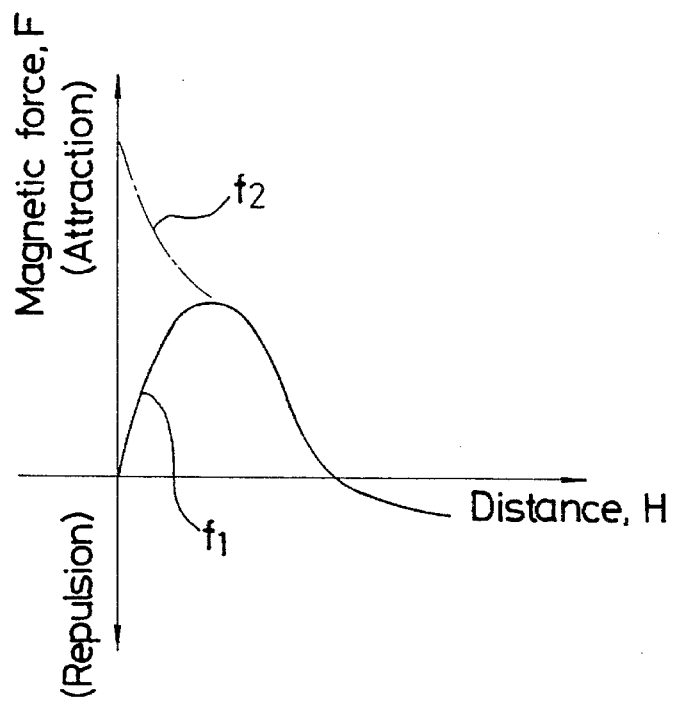
FIG. 4 is a diagrammatic representation of magnetic characteristics between a cylindrical permanent magnet and an inertia body in the trigger device shown in FIG. 2.

Incidentally, FIG. 4 illustrates changes in magnetic force (attraction) when the attracting disk 25 is arranged. In FIG. 4, magnetic force F is plotted along the axis of ordinates while the distance H between the end face 23b of the inertia body 23 and the detonator-side magnetic pole surface of the cylindrical permanent magnet 24 (see FIG. 2) is plotted along the axis of abscissas. Curve $f_1$ indicated by a solid curve represents magnetic characteristics when the attracting disk 25 is not arranged, while curve $f_2$ indicated by an alternative long and short dash line represents magnetic characteristics when the attracting plate 25 is disposed.

The magnetic characteristics indicate that the repulsion acting on the inertia body 23 becomes smaller as the inertia body 23 begins to move toward the detonator 10 and the distance H decreases and also that shortly before the end face 23b of the inertia body 24 enters the cylindrical permanent magnet 24, the magnetic force acting on the inertia body 23 is reversed in direction from repulsion to attraction. Accordingly, the attraction increases as the inertia body 23 advances further into the cylindrical permanent magnet 24.

A description will next be made of operation of the retractor 1 equipped with the pretensioner 3.

While a vehicle is running in a normal state, the pretensioner 3 is out of engagement with the take-up spindle so that the take-up spindle is rotatable freely. The webbing 16 can therefore be wound in under the biasing force of a winding spring and at the same time, wound out against the spring force.

When a deceleration of a certain value occurs on the vehicle due to sudden braking, the emergency lock mechanism 13 of the retractor 1 is actuated to lock rotation of the take-up spindle. As a result, the webbing is prevented from being wound out. Moreover, the inertia force acting on the inertia body 23 is smaller than the magnetic repulsion acting between the cylindrical permanent magnet 24 and the inertia body 23 and the trigger device 21 is not actuated. The drive means 4 for the pretensioner 3 therefore is not actuated.

When an extremely large predetermined deceleration occurs as in the case of a vehicular collision or the like, the inertia force acting on the inertia body 23 becomes greater than the magnetic repulsion acting between the cylindrical permanent magnet 24 and the inertia body 23 so that the inertia body 23 moves toward the detonator and strikes the flange portion 22b. As a consequence, the firing pin 22 strikes the detonator 10 and fires the same. By this firing of the detonator 10, the gas generator 8 within the drive means 4 is ignited. When the combustion gas blows out of the gas generator 8 and enters the cylinder 5, the piston 6 is promptly moved upwards (in the direction indicated by arrow X) by the pressure of the gas so produced. The wire 7 is immediately pulled in the direction indicated by arrow X by the drive force of the piston 6, the take-up spindle is driven in the webbing-winding direction. As a result, the webbing 16 applied on an occupant is wound in so that slack of the webbing is eliminated.

In the embodiment described above, the trigger device according to the present invention is applied as a trigger device for actuating the gas generator in the webbing tightener. The application is not limited thereto but the trigger device can be employed as a trigger device for actuating the gas generator in an air bag system.

No particular limitation is imposed on the polarities of the magnetic poles in the inertia body 23 and the cylindrical permanent magnet 24 as long as the magnetic poles of the same polarity are located opposite to each other and produce repulsion in the normal state that the inertia body 23 is apart from the cylindrical permanent magnet 24. The positions of the magnetic poles N and S in the inertia body 23 and the cylindrical permanent magnet 24 can be set conversely to this embodiment.

Figure 5:
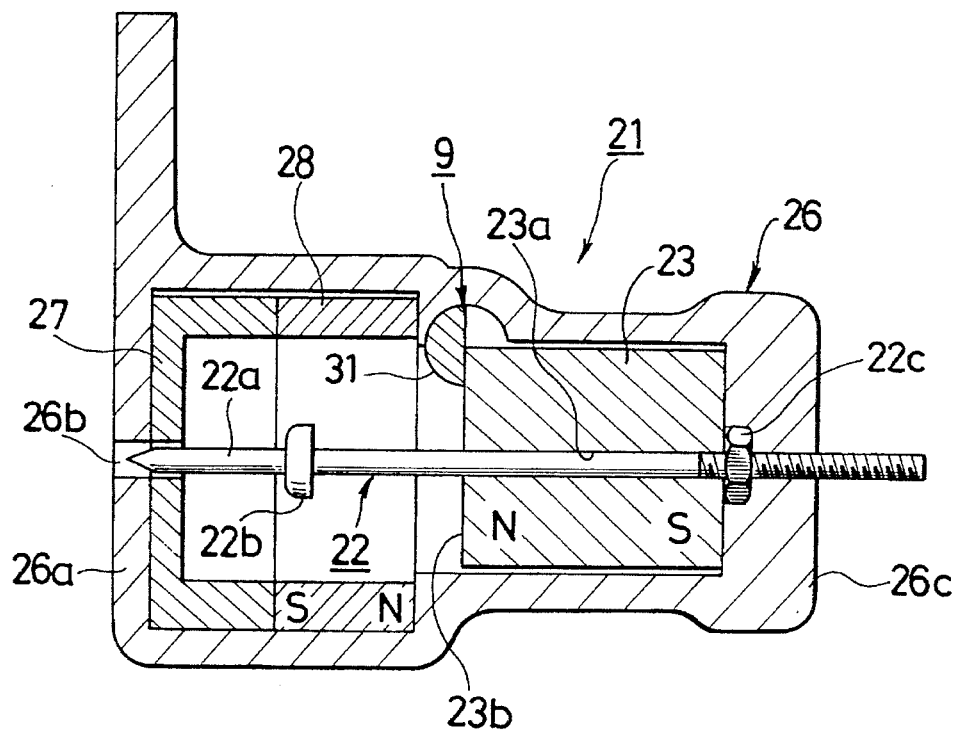
FIG. 5 is a vertical cross-section of a trigger device according to a second embodiment of the present invention.

In the illustrated embodiment, the attracting disk 24 has an outer diameter equal to the cylindrical permanent magnet 24. The dimensions and shape of the attracting plate 5 can be changed as needed and are not limited to those of the examples. Various magnetic materials can be used as needed without being limited to steel Incidentally, the attracting plate can be made in a form of a cup as shown in FIG. 5. The length of the cylindrical permanent magnet 28 can be shortened accordingly.

What is claimed is:

1. A trigger device for actuating a gas generator with a detonator incorporated therein, comprising:

a firing pin movable toward said detonator so that upon striking said detonator, said detonator is fired;

an inertia body formed of a permanent magnet for supplying kinetic energy to said firing pin and movable toward said detonator, said inertia body having one of N and S poles on one side thereof and the other pole on an opposite side thereof with respect to the direction of movement thereof;

a cylindrical permanent magnet having an inner diameter sufficient to permit passage of said inertia body and arranged between said inertia body and said detonator, said cylindrical permanent magnet having a pole, which is of the same polarity as said one pole, formed on a side closer to said inertia body and another pole, which is of the same polarity as said other pole, formed on a side closer to said detonator; and an attracting member made of a magnetic material and disposed on a detonator side of said cylindrical permanent magnet.

2. A trigger device according to claim 1, wherein said attracting member is disposed in close contact with said cylindrical permanent magnet.

3. A trigger device according to claim 1, wherein said firing pin extends through said inertia body and is provided on a side of said detonator with an engaged portion engageable with said inertia body.

4. A trigger device according to claim 1, wherein said attracting member has substantially the same profile as said cylindrical permanent magnet as viewed in the direction of movement of said inertia body.

5. A trigger device according to claim 1, further comprising a casing made of a non-magnetic material and holding therein said firing pin, said inertia body, said cylindrical permanent magnet and said attracting member.

6. A trigger device according to claim 5, further comprising an inadvertent actuation preventing mechanism with a stopper which is supported on said casing and is movable between a first position, where said stopper is located on the path of movement of said inertia body and interferes with said inertia body, and a second position where said stopper is located off the path of movement of said inertia body.

7. A trigger device according to claim 1, wherein said attracting member is in the form of a disk.

8. A trigger device according to claim 1, wherein said attracting member is in the form of a cup opening on a side of said cylindrical permanent magnet.

9. A trigger device for actuating a gas generator with a detonator incorporated therein, comprising:

a firing pin disposed movably toward said detonator so that upon striking said detonator, said detonator is fired;

an inertia body formed of a permanent magnet for supplying kinetic energy to said firing pin and disposed movably toward said detonator;

a cylindrical permanent magnet having a cavity of an inner diameter greater than a profile of said inertia body as viewed in the direction of movement of said inertia body; and an attracting disk made of a magnetic material, disposed in close contact with a detonator-side magnetic pole surface of said cylindrical permanent magnet and centrally defining a through-aperture through which said firing pin extends freely;

whereby upon occurrence of an acceleration of at least a predetermined value on said inertia body in a direction toward said detonator, said inertia body moves toward said detonator through said cavity of said cylindrical permanent magnet against magnetic repulsion between said cylindrical permanent magnet and said inertia body and causes said firing pin to move toward said detonator by magnetic attraction between said cylindrical permanent magnet and said firing pin.

* * * * *